United States Patent [19]
Cohen

[11] Patent Number: 4,614,412
[45] Date of Patent: Sep. 30, 1986

[54] MOUNTING ARRANGEMENT FOR A VEHICLE REAR VIEW MIRROR HAVING UNIVERSALLY MANIPULABLE JOINTS

[76] Inventor: Stephen R. Cohen, 1127 Bay Park Pl., Far Rockaway, N.Y. 11691

[21] Appl. No.: 675,074

[22] Filed: Nov. 26, 1984

Related U.S. Application Data

[63] Continuation-in-part of Ser. No. 424,575, Sep. 27, 1982, Pat. No. 4,486,075.

[51] Int. Cl.$^4$ ............................................. G02F 1/13
[52] U.S. Cl. .................................... 350/632; 350/636
[58] Field of Search ................................ 350/632, 636

[56] References Cited

U.S. PATENT DOCUMENTS

| | | | |
|---|---|---|---|
| 2,906,292 | 9/1959 | Mayo | 350/636 X |
| 3,229,581 | 1/1966 | Walter | 350/632 |
| 3,392,950 | 7/1968 | Pierce | 350/632 X |
| 4,422,724 | 12/1983 | Otsuka et al. | 350/636 |
| 4,486,075 | 12/1984 | Cohen | 350/603 |

FOREIGN PATENT DOCUMENTS

| | | | |
|---|---|---|---|
| 1266159 | 4/1968 | Fed. Rep. of Germany | 350/636 |
| 1565137 | 4/1969 | France | 350/632 |

*Primary Examiner*—John K. Corbin
*Assistant Examiner*—Richard F. Gallivan

[57] ABSTRACT

A mirror assembly for a vehicle, including a mirror unit which is mounted onto a vehicle windshield by means of a button and turtle arrangement. A connecting arrangement is utilized for connecting the mirror unit to the button and turtle arrangement which permits universally manipulatable orientation of the mirror unit. The connecting arrangement includes two colinear elongated cylindrical barrels. Appropriate swivel arrangements are provided within each barrel permitting swiveling to a desired position within one of a first set of planes which are perpendicular to the longitudinal axis of the connecting arrangement and also permits selective swiveling to a desired position within one of a second set of planes which intersect each other at the longitudinal axis of the connecting arrangement. The two cylindrical barrels are pivotally connected to permit rotation therebetween. In this manner, the mirrors can be positioned as desired for sufficient flexibility to accommodate each drivers's needs.

20 Claims, 7 Drawing Figures

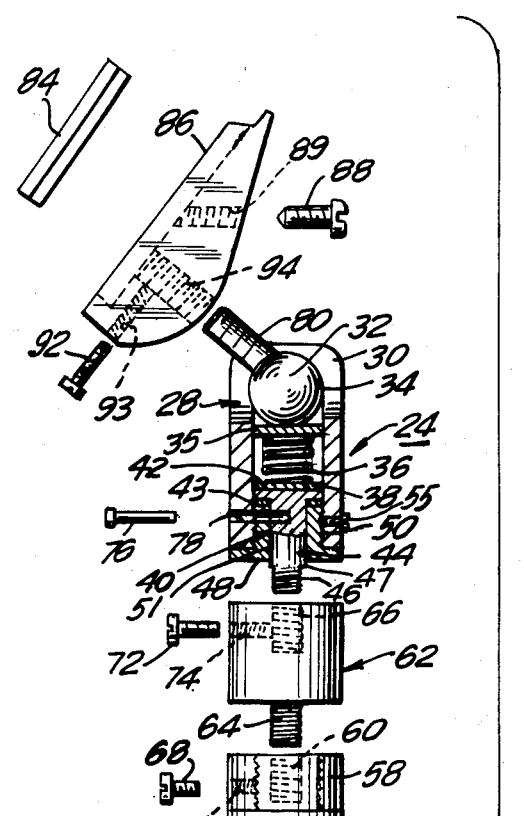

MOUNTING ARRANGEMENT FOR A VEHICLE REAR VIEW MIRROR HAVING UNIVERSALLY MANIPULABLE JOINTS

REFERENCE TO OTHER APPLICATIONS

This invention is a Continuation-in-Part application to co-pending Application Ser. No. 424,575 filed Sept. 27, 1982, now U.S. Pat. No. 4,486,075, by the present inventor for a Mirror Assembly For A Vehicle.

BACKGROUND OF THE INVENTION

This invention relates to mirror assemblies for a vehicle, and more particularly to an improved mounting arrangement for a rear view mirror for use on a vehicle.

Rear view mirrors are regularly utilized in a vehicle in order to permit the driver to view what is behind him. Such mirrors require extreme versatility to be able to manipulate the mirror to a desired position so that the driver can gain a proper view of the rear of the vehicle. Depending upon the size of the driver, the particular method of his driving and numerous other factors, each driver will require a different position of the mirror in order to properly gain an adequate view.

One particular arrangement which is utilized for manipulation of the rear view mirror is described in U.S. Pat. No. 3,367,616. In such arrangement, a button and shoe, generally referred to as a "turtle", is provided on the windshield from which extends an elongated barrel having a universal swivel at each end thereof. The mirror unit itself is connected at the distal end of the swivel. This arrangement permits a considerable amount of manipulation of the mirror and has been generally utilized in many vehicles.

Despite the manipulation capabilities thus far achieved, it has been found that there is still inadequate capability for viewing a wide area and inadequate capability in full manipulation of the rear view mirror. As a result, numerous suggestions have been made to expand the mirror unit by incorporating adjacent auxiliary mirrors in order to enhance the angle of viewing of the driver and cover normal "dead spots" which are not readily visible using a single mirror.

One such mirror arrangement is described in the aforementioned co-pending application Ser. No. 424,575 wherein there is described a mirror assembly having a standard rearward viewing mirror with adjacent mirror units wherein the mirrors can be positioned adjacent and substantially contiguous with each other. At the same time, the mirrors have a convex mirror on one side and a flat mirror on the other side.

While all of the aforementioned have provided improvement in utilization of rear view mirrors, there appears to be need for sufficient ability to manipulate a rear view mirror. The critical factor in providing adequate rear view capability appears to be in the adequacy of the manipulation capability of the mirror unit itself.

SUMMARY OF THE INVENTION

Accordingly, it is an object of the present invention to provide an improved mirror assembly for a vehicle which provides adequate manipulatable capability to position the mirror at a desired orientation for best viewing by the driver.

A further object of the present invention is to provide a mirror assembly which permits universal manipulation of the mirror assembly with respect to the vehicle.

Yet a further object of the present invention is to provide a mirror assembly for a vehicle which permits utilization of a series of mirrors adjacent to each other with the mirrors being sufficiently manipulatable to provide adequate coverage of rearward viewing by the driver.

Yet a further object of the present invention is to provide a mirror assembly for a vehicle providing an improved coupling arrangement between the mirror and the vehicle which permits storing of the mirror behind the sun visor when the mirror is not in use.

A further object of the present invention is to provide a mirror assembly which is mounted on the vehicle by means of a sliding turtle and button arrangement to add manipulation capabilities to the mirror assembly.

Still another object of the present invention is to provide a mirror assembly for a vehicle which permits utilization of a double sided mirror with various combinations between a planar mirror and a convex mirror including the capability of convex mirrors on both sides.

Briefly, in accordance with the present invention, there is provided a mirror assembly for a vehicle which includes a mirror unit supported on the vehicle typically by means of a button and turtle arrangement. A connecting arrangement is provided between the mirror unit and the support. The connecting arrangement includes two coupling members which are elongated in shape and colinearly connected together for rotation therebetween. Each of the coupling members includes the capability of swiveling to a desired position within any one of a first set planar surfaces which surfaces are perpendicular to the longitudinal axis of the coupling member. Additionally, it permits swiveling to a desired position within a desired one of a second set of planar surfaces which include the longitudinal axis of the coupling member.

In an embodiment of the invention, the coupling members further permit rotating about the longitudinal axis of the coupling member itself.

In a further embodiment of the invention, the button and turtle arrangement is one which permits sliding of the turtle along the surface of the button to appropriately position the turtle longitudinally along the button. A further embodiment permits reorientation of the mirror with respect to the coupling arrangement so that the mirror unit itself can be shifted to a desired position on the coupling members.

The aforementioned and other objects, features and advantages of the invention will, in part, be pointed out with particularity, and will, in part, become obvious from the following more detailed description of the invention taken in conjunction with the accompanying drawings, which form an integral part thereof.

BRIEF DESCRIPTION OF THE DRAWINGS

In the drawings:

FIG. 3 is an exploded elevational view, partially sectioned, showing the construction of the mirror assembly in accordance with an embodiment of the present invention;

FIG. 4 is an exploded elevational view, partially in section, showing the connection between the connecting means and the support;

FIG. 5 is a perspective view of an elongated button and adjustable sliding turtle arrangement for supporting the mirror unit on a vehicle windshield;

FIG. 6 is an exploded view shown in section, of a part of the mirror unit permitting convex surfaces on both sides thereof; and FIG. 7 is a rear elevational view of the mirror back plate unit showing the adjustability of the mirror unit on the connecting stem.

In the various figures of the drawings, like reference characters designate like parts.

DESCRIPTION OF THE PREFERRED EMBODIMENT

Figure 1:
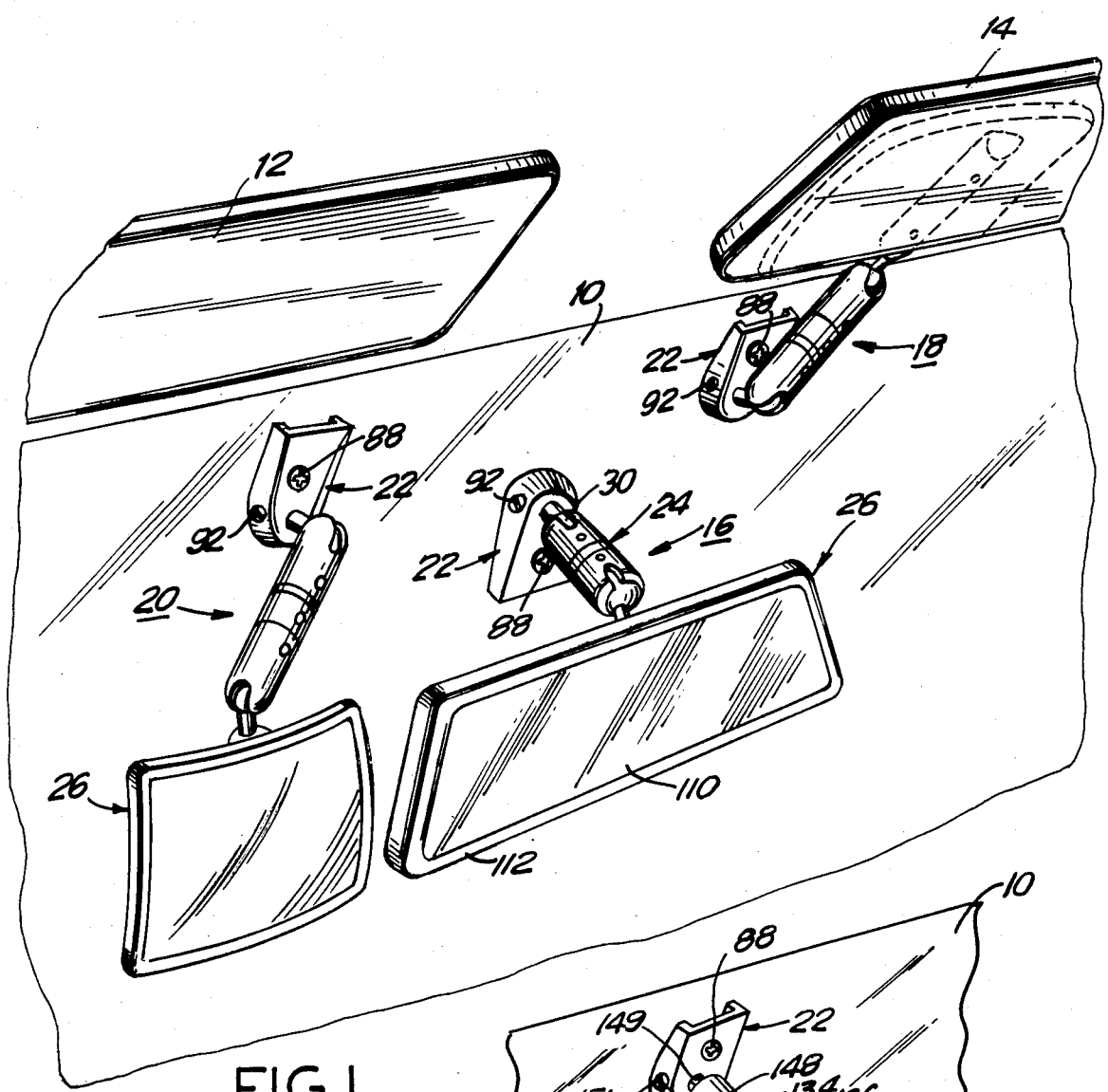
FIG. 1 is a perspective view of a windshield of a vehicle showing a number of mirror assemblies in accordance with the present invention and including the feature of having one of the auxiliary mirrors capable of being tucked away behind a sun visor.

Referring now to FIG. 1, there is shown a vehicle windshield 10 having a pair of sun visors 12, 14 extending above the windshield. On the windshield there are located three adjacent mirror assemblies identified generally as 16, 18, and 20.

Each of the mirror assemblies includes a support arrangement 22 which is mounted on the inside surface of the windshield and from which extends a connecting arrangement 24 serving to interconnect the mirror unit 26 with the support arrangement 22 and permitting manipulation of the mirror unit 26. The individual connecting arrangements 24 are such as to permit universal manipulation of the respective mirror units 26 so as to adequately permit the respective mirror units 26 to be adjusted to a desired position for best viewing by the driver.

The connecting arrangements 24 have a longitudinal axis passing through a cylindrical composite arrangement. By means of various means to be hereinafter described, they permit manipulation of the respective mirror units 26 so that they can be moved pivotally within a series of planar surfaces each of the planes being perpendicular to the longitudinal axis. At the same time, it also permits pivotal swiveling to any position within another set of planes which include the longitudinal axis. Additionally, it also permits the mirror unit to be rotated about the longitudinal axis itself.

As a result of these multiple manipulations, each mirror unit can be arranged in a universal arrangement with adequate manipulation for each desired position.

The connecting arrangement can be utilized as the main mirror of a vehicle and used by itself without any additional mirrors. However, in order to provide broader mirror coverage, as shown in FIG. 1, in addition to the main mirror, two additional mirrors can be added, laterally on either side thereof to provide a contiguous arrangement therebetween, thereby extending the range of viewing of the driver to cover all "dead spots" behind him. It should be noted, that by utilizing the unique connecting arrangement of the present invention, each of the mirror assemblies can be manipulated independently so that they can bring about the best positions available independently and jointly for driver viewing.

At the same time, because the connecting arrangement is elongated, it is possible to bend either of the lateral side mirrors 20, 18 so that it can tuck away behind the respective sun visor 12, 14. As shown in dotted lines, the mirror assembly 18 is tucked behind the sun visor 14. This permits storage of the side mirror when not in use so that it will be unobtrusive. At the same time, it can be easily folded downwardly, even without lowering the sun visor and placed into proper position for utilization.

As will hereinafter be explained, the mirror assemblies can either include just a planar mirror on one side or can be composite so as to include planar mirror on one side and a convex mirror on the opposing side. Alternately, convex mirrors can be used on both sides with each of the convexities differing as desired. Because of the manipulation capability, it is possible to swivel each of the mirror assemblies about its own axis so that either the convex surface on one side, or the planar or convex surface on the opposing side can be utilized. In either case, the mirrors can be independently adjusted and properly manipulated so that they are placed contiguous with each other and at the desired position for best viewing.

Referring now to FIGS. 1 and 3, one embodiment of the connecting arrangement 24 is shown. Specifically, the connecting arrangement is shown in FIG. 3 to include an upper cylindrical barrel 28 having a bifurcated slot arrangement 30 at one end thereof. A swivel ball 32 is captured by means of the inwardly directed side shoulder of the slot 34. The ball 32 is permitted to rotate about its own axis, and at the same time is capable of 180 degrees of pivot movement within the bifurcated slot. Accordingly, a modified ball and socket arrangement is provided with limited pivotal movement to within the bifurcated slot.

The ball 32 is secured by means of a seat 35 which is held in place on top of a tension spring 36. At the lower end of the tension spring there can be included a further plate 38 beneath which there is provided a rotating stud member 40. The stud includes a substantially flat upper surface 42 with a cylindrical body portion 44 terminating in a projecting threaded stud 46. The stud 40 is held in place by a washer 43 which sits onto a threaded plug member having a head 48 which abuts the outer lower face of the barrel 28 and threads inside thereof by means of the cylindrical exteriorly threaded portion 50. The interior of the plug 48 has a smooth bore 51 for rotatingly receiving the smooth cylindrical body portion 44 of the stud member. The plug is held in the barrel by lock screw 55. The stud 46 has a shoulder portion 47 which extends slightly beyond the face of the plug 48.

With the arrangement as shown, the stud member 40 can rotate about the longitudinal axis of the cylindrical barrel 28. With this portion of the arrangement thus described, it will be noted that the cylindrical barrel can be rotated to any position about a planar surface perpendicular to the longitudinal axis. At each position within that plane, the swivel ball 32 can swing 180 degrees about a plane perpendicular thereto which plane includes the longitudinal axis of the cylindrical barrel. Accordingly, a set of parallel planes are provided through which the arrangement can be rotated which set are intersecting and all including at their center the longitudinal axis. At the same time, by first orienting the swivel ball at a desired location, it is then possible to provide the rotation of the stud member 40 in a circular plane. In this manner, a series of circular planes are provided through which the arrangement permits relative rotation, with all of the planes being perpendicular to the longitudinal axis. Barrels 52 and 24 can be reversed so that the stud 46 would project upwardly and be received in the corresponding female socket. The upper balls swivel would still connect to the turtle and the lower ball swivel would connect to the stem of the mirror.

The connection arrangement further includes a lower cylindrical barrel 52 which likewise includes a bifurcated slot 54 at one end thereof in which is positioned a swivel ball 56. This acts as a ball and socket arrangement having a limited swivel movement to 180 degrees within the slot 54. As with the upper arrangement, the ball 56 can be held in place by means of a seat, if desired, which is then held in place by means of a tension spring.

To close the cylindrical barrel 52, there is provided a threaded plug 58 having an internally threaded female socket 60.

If desired, the upper cylindrical barrel with the projecting male stud 46 can be threaded directly into the female socket 60 of the lower cylindrical barrel 52. This in fact is the arrangement shown at 24 for the central mirror assembly 16 shown in FIG. 1. Alternately, in order to provide a greater length of the unit, a spacer member 62 can be interspaced between the upper cylindrical barrel unit 28 and the lower unit 52. The spacer 62 includes a male threaded member 64 projecting from one end thereof which would thread into the female socket 60. At the opposing end thereof is provided a female threaded socket 66 which receives the male stud 46 projecting from the cylindrical barrel portion 28. One side of studs 46 and 64 can be flattened to be locked in place by lock screws 68 and 72. Alternately, the spacer 62 can have a threaded bore entirely therethrough and the stud 46 can be long enough to thread entirely through the spacer 62 and external therefrom to engage directly into the female socket 60.

In order to secure the male portions into their respective female socket portions, there can be included the locking screw 68 which can thread into the threaded locking hole 70 in the lower tubular barrel portion 52. A locking screw 72 can likewise be threaded into hole 74 in the spacer unit 62. In this manner, once the male members are threaded, they can be locked in place to prevent rotation thereof. Therefore the only rotation between the two cylindrical barrel portions will be the swivel rotation provided by the male stud 40 which rotates within its plug 48.

When it is desired to separate or combine the spacer to the assembly, it is helpful to be able to prevent the rotation of the male stud 40. Accordingly, a holding pin 76 is inserted into the bore 78 which extends into the male stud 40. This locks the male stud in place and permits separation or combination of the conecting assembly.

The upper swivel ball 32 continues into a stem 80 which is externally threaded for connection to the turtle 86. The support itself is shown to be a standard sliding clamp or turtle 86 which slides onto a button 84 which could be adhesively mounted onto a vehicle windshield during final construction of the vehicle. An appropriate sliding clamp or turtle 86, as is well known in the art would be secured to the button 84 by means of the locking screw 88 threaded into hole 89. The stem 80 has one side thereof flattened and threads into a threaded bore 94 in the turtle 86 and is secured in place by means of the lock screw 92 threaded into hole 93.

The other swivel ball 56 extends into a stem 96 continuing into the support arm 98 on which the mirror unit itself is placed. The support arm 98 can have a series of threaded holes 100. On one side thereof is placed a flat plate 102 having corresponding aligned holes 104 with screws 106 inserted therethrough to mount the plate 102 onto the arm 98. Mounted thereon would be the flat mirror 110 which can be held in place onto the plate 102 by means of the electrical tape 111 such as PVC tape, covered by the flexible rim 112 extending entirely around the mirror, as shown in FIG. 1.

On the opposing side of the arm 98 there can be placed a convex support plate 114 again having aligned mounting holes 116 for receiving the mounting screws 118 therethrough. On the convex surface there would be placed a convex mirror 120 again held in place by means of the peripheral electrical tape 121 on which is placed rim 122.

With the arrangement as shown, by pivoting the arm 98 about its own axis, the planar mirror on one surface thereof can be rearwardly directed for use by the driver. Alternately, pivoting the mirror about its own axis the convex mirror 120 can be rearwardly facing for use by the driver.

In addition to the planar surface on one side and the convex surface on the other side, FIG. 6 now shows that it is possible to have a convex mirror on either side. As shown in FIG. 6, the arm 124 which would extend to the lower swivel ball 56 would have a convex plate 126 on one side thereof and another convex plate 128 on the opposite side thereof. Again, appropriate convex mirrors 130 and 132 would be placed against the surfaces 126, 128 and properly held in place with tape and trim in order to provide convex arrangements on both sides. Screw holes 125, 127 and 129 can be provided for receiving rivets to hold the arrangement together.

Other arrangements could be utilized in order to provide the appropriate convex or planar arrangements. For example, the stem 124 itself could be oval shape in cross section to conform to the convex sheet metal serving as the mirror backing plate. Alternately, the convex plates 128 and 126 can be solid aluminum or plastic.

By utilizing the removable elastic rim 112, 122, to hold the mirrors in place, it is possible to actually modify the mirror by stretching the rim to pull it off and replace the mirror and backing plate with another mirror of greater or lesser convexity, or change a convex to a flat or a flat to a convex.

Figure 2:
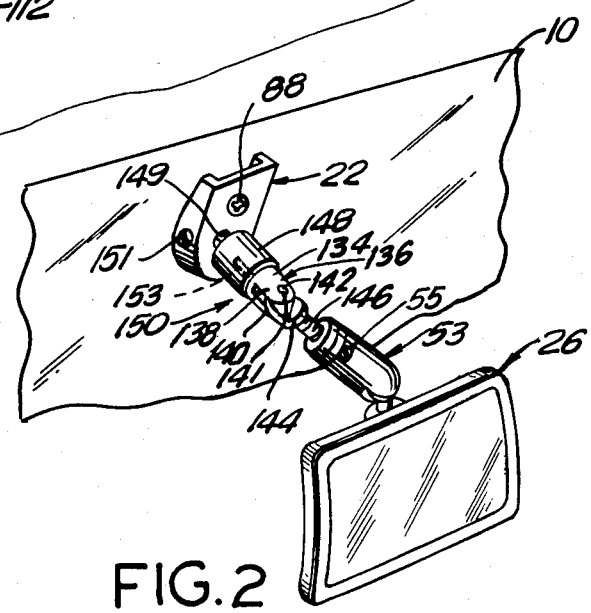
FIG. 2 is a perspective view of another embodiment of a mirror assembly in accordance with the present invention shown mounted on a vehicle windshield.

Referring now to FIG. 2, it will be seen that an alternate type of connecting arrangement can be utilized. In this case, again, the button and turtle arrangement 22 is provided. A cylindrical barrel portion 53 is shown similar to barrel 24 of FIG. 3. However, this barrel is now utilized at the opposite end of the unit and serves to hold the mirror unit 26 thereon. In place of the upper barrel unit 24 shown in FIG. 3, there is shown a different type of connecting arrangement at the upper end. In this case, a cylindrical plug 134 has a clevis arrangement 136 at its distal end which includes the opposing ears 138, 140 with the pin 142 therebetween. A flat pivot plate 144 is pivotally connected by means of the pin 142 and can rotate 180 degrees within the clevis. The threaded male stud 146 extends from pivot plate 144 and is received in a female socket provided in the cylindrical barrel 53. Barrel 53 is the same as barrel of FIG. 3. However, stud 46 is sheared at the face of plug 48 and then has a threaded bore formed into that member to receive stud 146. Clevis 136 has a smooth bore hole 141 on one leg and threaded bore on the other leg to receive the threaded pin 142.

The cylindrical plug 134 is received in a cylindrical barrel 148 and is held in place typically by means of a press fit. However, the barrel 134 can rotate within the cylindrical barrel 148. The barrel 148 continues to a machine screw with a flat side and is fastened to turtle 22. To prevent barrel 148 from rotating freely or loosening itself, a lock screw 151 is inserted from the side of the turtle 22. The barrel 148 can have a decorative cover. The underlying plug has a long cut 153 therein to provide the frictional engagement therewith.

In this manner, the arrangement shown generally at 150 provides substantially identical manipulation capability as does the cylindrical barrel portions 24 and can be used interchangeably therewith.

Accordingly, it should be appreciated that various combinations of the connecting arrangements can be utilized to achieve the present purpose. As shown in FIG. 1, two substantially identical cylindrical barrel portions can be interconnected, one serving as the male and the other as the female portion. Alternately, two of the connecting arrangements 150 can be used together or interchange between one of the arrangements shown at 150 and one of the cylindrical barrel portions shown in FIG. 1 can be interconnected as shown in FIG. 2.

As shown in FIG. 7, the mirror backplate unit 26 itself can be adjusted on the arm 98. In addition to the threaded screws 152, 154 which secure the arm 98 to the mirror back plate unit 26, additional threaded holes 156 are provided for adjusting the position of the mirror backplate unit on the arm 98. This again gives additional manipulation capabilities.

As shown in FIG. 4, the connecting arrangement can be connected to the turtle by means of a different arrangement than the screw arrangement shown in FIG. 3. For example, in this case a bore 160 having a countersunk portion 162 is formed into the turtle 164. The stem 166 extending from the cylindrical barrel portion arrangement shown generally at 168 would be received into the bore 160. An annular groove 170 is formed at the distal end of the stem 166 which groove would be positioned within the countersunk portion 162. A split locking washer 172 or retaining ring or E ring would be placed in the countersunk portion 162 and received within the groove 170 so as to securely retain the stem into the turtle. The screw 174 is used to lock the turtle onto the button as heretofore explained. Turtle 164 has a cut extending from bore 160 downward completely therethrough, to permit compression against 166 to restrict 166 from swiveling freely.

As shown in FIG. 5, a modified form of the button and sliding turtle arrangement can be utilized to facilitate such additional manipulation. Specifically, there is shown an elongated button or rail portion 180 formed as an elongated bar. Side undercuts 182, 184 are formed on one surface thereof so as to define a forward projecting surface 186 which surface would be the one mounted onto the windshield by means of adhesive or by having 2 holes drilled through 180 and 186 for fastening to the top of the windshield frame.

The sliding turtle itself is formed as an elongated block 188 of shorter length than the bar 180. A channel 190 is formed adjacent one face thereof with inwardly directed arms 200 opposing each other and being received within the undercut shoulders 182, 184. In this manner, the elongated turtle 188 can slide along the elongated button and be positioned therealong as is desired. The locking screws 192, 194 are utilized to lock the turtle onto the button when properly positioned. The swivel ball 198 with the stem 201 is threaded into the opening 202 provided in the turtle portion. The stem 201 is flattened on one side and is locked in place by the locking screw 203. It should be appreciated, that for a hinged swivel of the type shown in FIG. 4, that the bore 202 would be smooth and a transverse cut would be made to permit insertion of the stem directly into the smooth bore. The stem would then be held in place by means of a E-ring or lock washer 172, as shown in FIG. 4.

By means of the present described arrangements, greater flexibility and manipulation of the mirror unit can be provided than has heretofore been provided in the prior art. Furthermore, a series of mirrors can be utilized and the capability is provided for greater adjustability of the mirrors including tucking away of the mirror behind a sun visor.

In FIG. 2, the lower barrel 53 could be identical with the barrel 24 of FIG. 3 retaining the rotating stud 46 extending therefrom. A center spacer similar to 62 could have a female socket at one end to receive the stud 146, similar to the socket 66 shown in FIG. 3. However, at the other end of the spacer 62 would be the pivot plate 144 which would pivotally fit within the clevis 136 of barrel 150 and be retained in place by the pin 142.

Because of the particular structure of the present invention, including the bifurcated slots, the clevis arrangements, and the stud swivel, there is greater adaptability to various windshield curvatures permitting the mounting of the mirrors to achieve a correct alignment for rearviewing by the driver.

There has been described heretofore the best embodiments of the invention presently comtemplated. However, it is to be understood that various changes and modification may be made thereto without departing from the spirit of the invention.

I claim:

1. A mirror assembly for a vehicle, comprising: a mirror unit, support means for securely mounting the mirror unit to the vehicle, and connecting means for coupling said mirror unit in a universally manipulatable relationship with said support means, said connecting means comprising first and second colinear elongated coupling members, each coupling member comprising means for selectively swiveling to a desired position within a desired one of a first set of planes which are perpendicular to the longitudinal axis of the coupling members, and means for selectively swiveling to a desired position within a desired one of a second set of planes which intersect each other at the longitudinal axis of the coupling member, and pivot means for rotatingly connecting said first and second coupling means along their colinear longitudinal axes.

2. A mirror assembly as in claim 1, wherein each of said coupling members further comprise means for rotating about the longitudinal axis of said coupling member.

3. A mirror assembly as in claim 2, and comprising a seat positioned in said cylindrical barrel for supporting said swivel ball, and a tension spring for mounting said seat against said swivel ball.

4. A mirror assembly as in claim 2, wherein at least one coupling member comprises a cylindrical plug, a clevis formed at one end thereof, a stem pivotally projecting from said clevis, and a cylindrical barrel, wherein said cylindrical plug is rotatingly secured within said cylindrical barrel.

5. A mirror assembly as in claim 1, wherein at least one coupling member comprises a cylindrical, a bifurcated socket at one end thereof, a swivel ball captured within said socket and restricted to 180 degrees pivotal movement within said bifurcation and free rotation about the longitudinal axis of the barrel, and a stem projecting from said ball for connection to one of said support means and mirror unit.

6. A mirror assembly as in claim 5, and further comprising a female threaded plug member threadingly secured into the opposing end of one of said cylindrical barrels, a male threaded stud projecting from the other of said cylindrical barrels and threadingly engaging said female plug member to rotatingly connect said first and second coupling means.

7. A mirror assembly as in claim 6, wherein said other cylindrical barrel comprises a sealing plug threadingly secured into the other end thereof, a smooth internal bore formed through said sealing plug, a stud member having an enlarged flat head rotatingly abutting the internal end of said sealing plug, a smooth cylindrical body rotatingly received within said smooth bore and a threaded end projecting from said cylindrical barrel, and a tension spring in said cylindrical barrel extending between a swivel ball at one end and said flat head at the other end.

8. A mirror assembly as in claim 7, and comprising an aligned locking hole transversely formed into said other cylindrical barrel and extending into said stud member, and a locking pin for insertion into said locking hole for preventing rotation of said stud member within said other cylindrical barrel to permit disassembly of said coupling members.

9. A mirror assembly as in claim 6, and comprising a tension spring in said one cylindrical barrel extending between said swivel ball at one end and said female plug member at the other end thereof.

10. A mirror assembly as in claim 6, wherein said male stud has one side flattened, and further comprising a locking screw threaded into said female plug member for securing said male stud.

11. A mirror assembly as in claim 6, and comprising cylindrical spacer means interconnecting said first and second coupling means, one end of said spacer means having a female threaded socket therein and the opposing end having a projecting threaded male member.

12. A mirror assembly as in claim 11, wherein said male member has one side flattened and further comprising an additional locking screw threaded into said spacer for securing said male member.

13. A mirror assembly as in claim 1, wherein said mirror unit comprises a double sided mirror, at least one side thereof being convex.

14. A mirror assembly as in claim 1, wherein said mirror unit comprises a support stem extending from one of said coupling members, a mirror having a solid backing member, and a plurality of mounting means on said backing member, whereby said mirror unit can be cylindrically mounted onto said support stem.

15. A mirror assembly as in claim 1, wherein said support means comprises a button for permanently mounting inside a vehicle windshield, and a turtle detachably coupled to said button, and securing means connecting one end of one coupling member to said turtle.

16. A mirror assembly as in claim 15, wherein said securing means comprises a countersunk bore formed into said turtle, a stem extending from one end of said one coupling member and received in said bore, an annular groove formed adjacent the distal end of said stem aligned with the countersink, and a lock washer sitting in said counter sink and received in said groove for locking said coupling member to said turtle.

17. A mirror assembly as in claim 15, wherein said button comprises an elongated bar having a pair of opposing longitudinally extending undercut shoulders, and said turtle comprises an elongated block, a longitudinal channel formed at one surface thereof and having an exposed mouth and a pair of opposing inwardly directed arms, said button slidably received in said channel, and locking means for securing
    said button at a desired longitudinal position therealong.

18. A group of rear view mirrors, each rear view mirror comprising a mirror assembly as in claim 1, said mirror assemblies being adjacently positioned to effectively provide a continuous mirror arrangement oriented at a desired angular position.

19. A group of rear view mirrors as in claim 18, wherein said connecting means is of a length sufficient to permit its mirror unit to reach the sun visor when in its stored position, whereby the mirror unit can be tucked away beneath the sun visor for storage.

20. A mirror assembly as in claim 1, wherein said mirror unit comprises a support plate, a mirrored plate, and a removable rim whereby the type of mirrored plate can be changed as desired.

* * * * *